United States Patent [19]

Schaefer et al.

[11] Patent Number: 4,684,837
[45] Date of Patent: Aug. 4, 1987

[54] ELECTRIC SUBMERSIBLE MOTOR WITH DUAL SNAP RING CLAMP

[75] Inventors: Edward J. Schaefer; Kenneth D. George, both of Bluffton, Ind.

[73] Assignee: Franklin Electric Co., Inc., Bluffton, Ind.

[21] Appl. No.: 793,171

[22] Filed: Oct. 31, 1985

Related U.S. Application Data

[63] Continuation-in-part of Ser. No. 736,106, May 20, 1985, abandoned.

[51] Int. Cl.⁴ .................... F04B 39/12; H02K 15/14
[52] U.S. Cl. ........................... 310/87; 310/89; 310/42
[58] Field of Search .............. 310/42, 87, 89, 91, 310/254, 258, 90; 166/65.1, 88

[56] References Cited

U.S. PATENT DOCUMENTS

| | | | |
|---|---|---|---|
| 3,128,399 | 4/1964 | O'Reilly | 310/87 |
| 3,135,884 | 6/1964 | Luenberger | 310/87 |
| 3,350,585 | 10/1967 | Maynard | 310/87 |
| 3,369,136 | 2/1968 | Sanger | 310/87 |
| 3,369,137 | 2/1968 | Sanger | 310/87 |
| 3,742,595 | 7/1973 | Lykes | 310/87 |
| 3,826,936 | 7/1974 | O'Rourke | 310/87 |
| 4,015,633 | 4/1977 | Mandell | 310/87 |
| 4,121,127 | 10/1978 | Adelski | 310/67 R |
| 4,128,935 | 12/1978 | Czech et al. | 310/43 |
| 4,204,314 | 5/1980 | Workman | 310/42 |
| 4,281,973 | 8/1981 | Meneghello | 310/87 |
| 4,404,483 | 9/1983 | Lebkuchner | 310/87 |
| 4,454,439 | 6/1984 | Okamoto et al. | 310/179 |
| 4,540,906 | 9/1985 | Blom | 310/42 |

Primary Examiner—Patrick R. Salce
Assistant Examiner—D. L. Rebsch
Attorney, Agent, or Firm—Marshall, O'Toole, Gerstein, Murray & Bicknell

[57] ABSTRACT

A motor comprising a stator core having stator windings wound thereon and an elongated outer shell which surrounds the core and the windings, the shell extending lengthwise beyond the end turns of the windings and supporting the motor bearings. The core is slidable in the shell but is retained in place in the lengthwise direction by first and second abutments fastened to the interior of the shell at opposite ends of the stator. At least one of the abutments is a ring which may be removed, thereby enabling easy assembly or disassembly of the motor. The core is retained against angular movement by a key which engages lengthwise extending keyways in the core and the shell. Tubular spacers are mounted between the stator core and the abutments.

6 Claims, 10 Drawing Figures

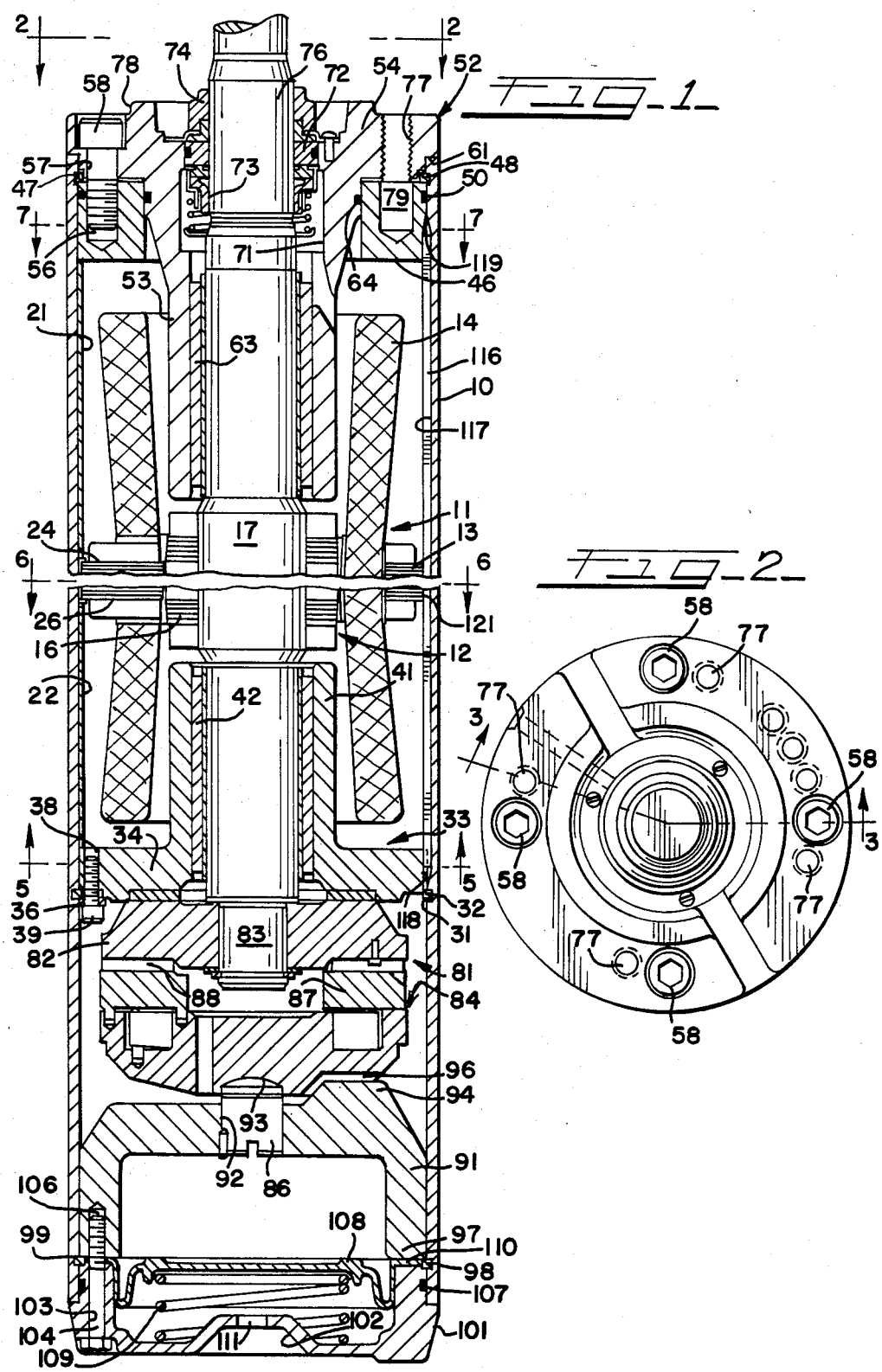

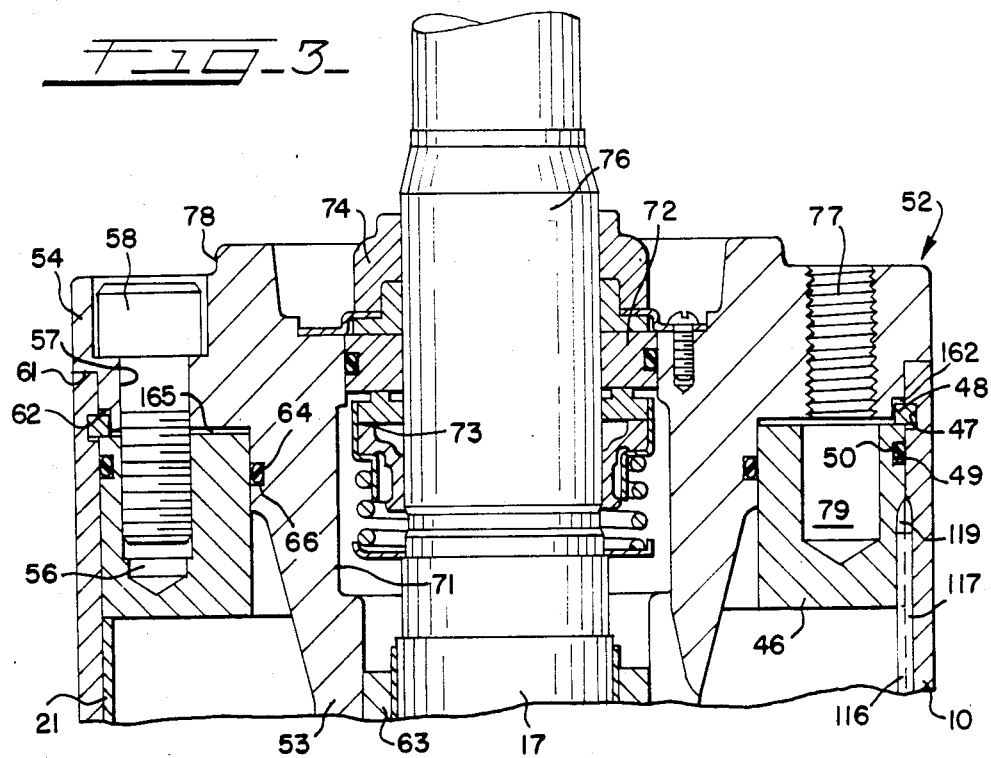
FIG_3_
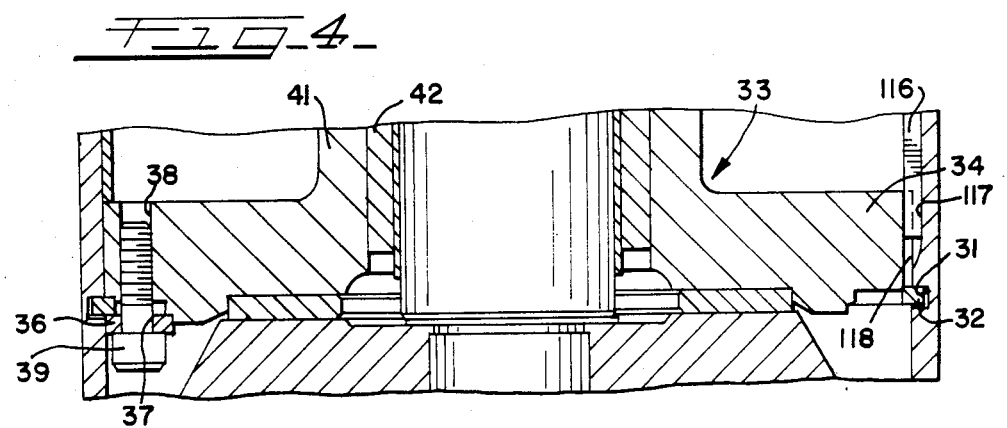
FIG_4_

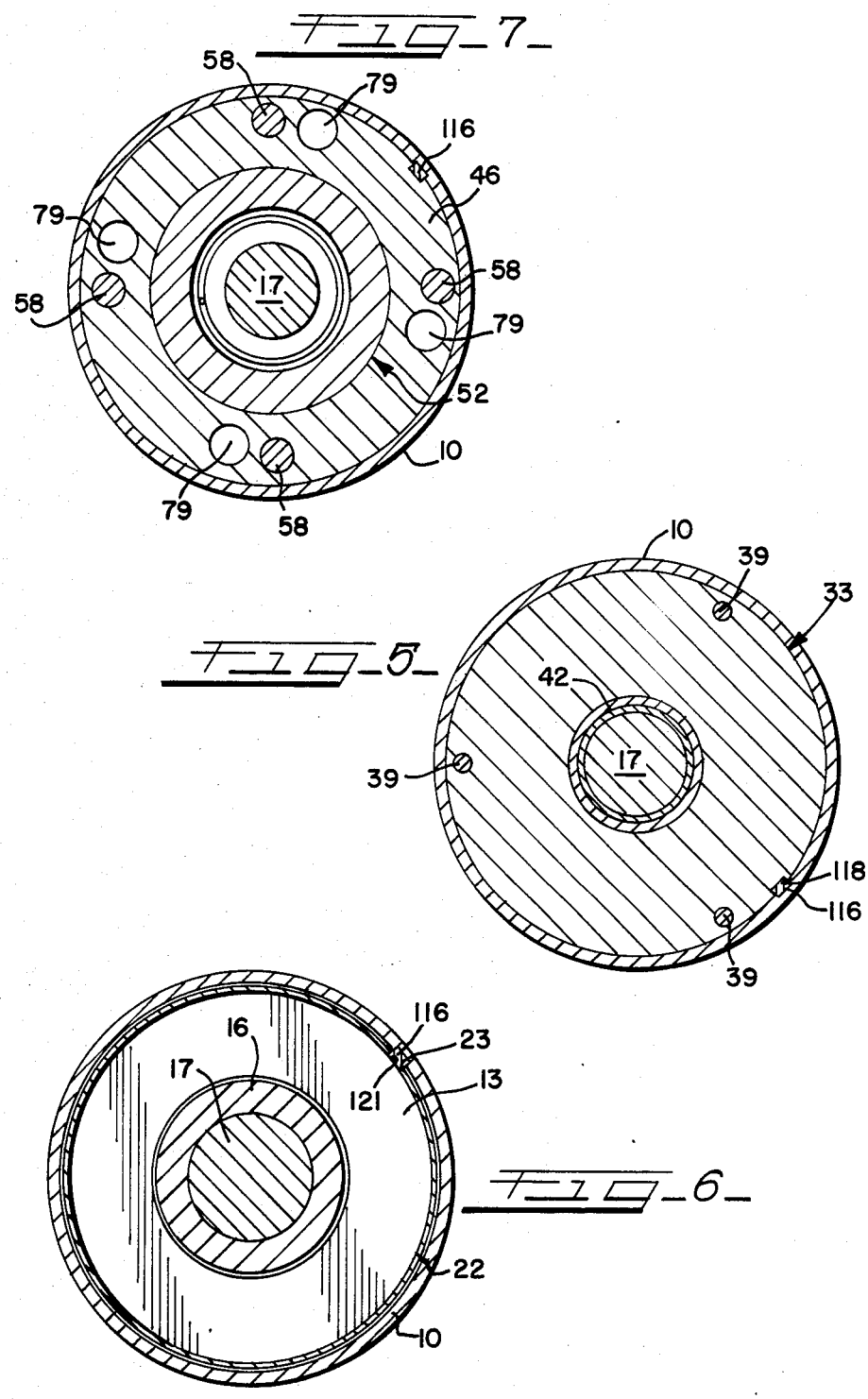

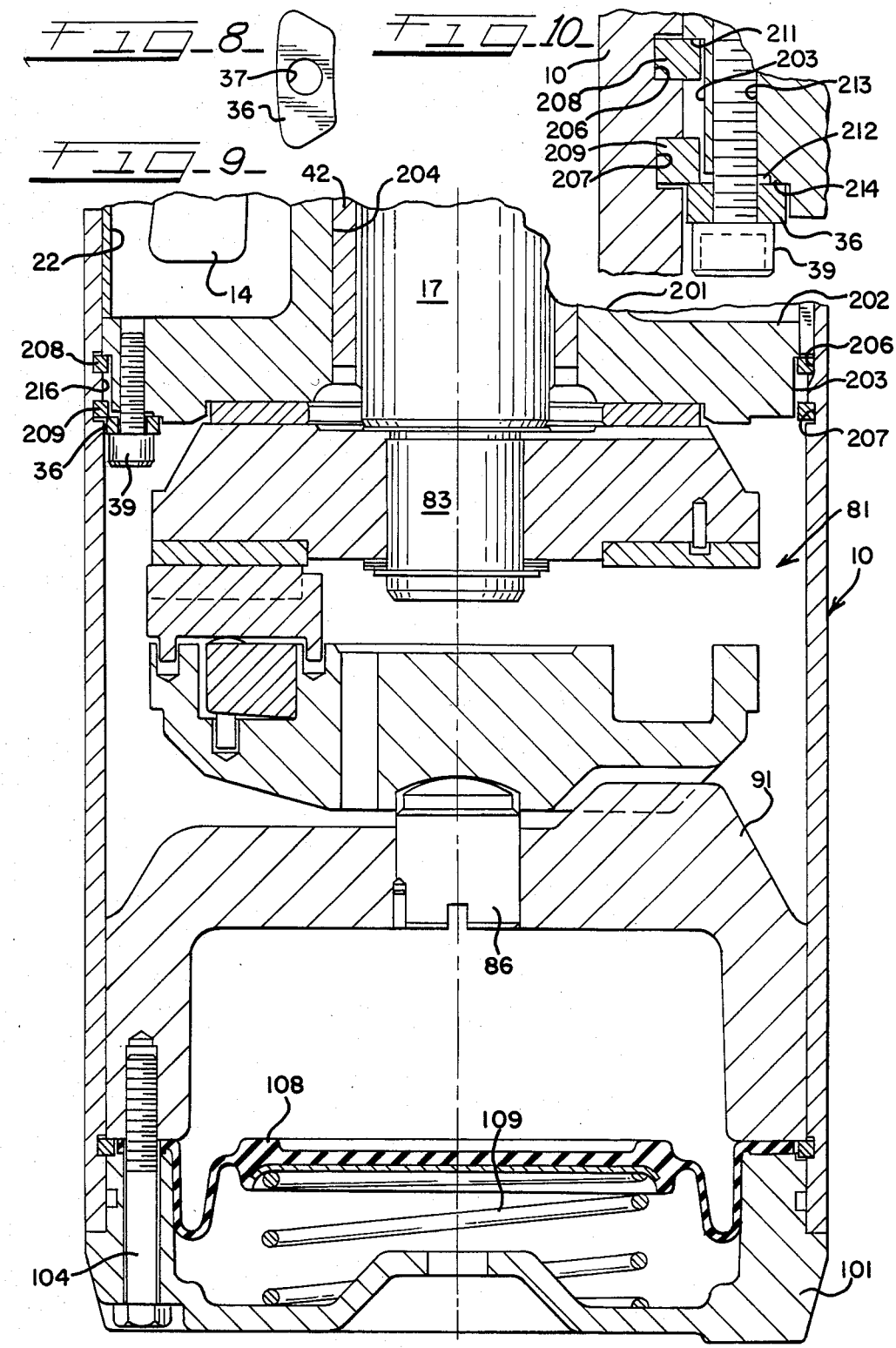

ELECTRIC SUBMERSIBLE MOTOR WITH DUAL SNAP RING CLAMP

RELATED APPLICATIONS

Field and Background of the Invention

This application is a continuation-in-part of application Ser. No. 736,106, filed May 20, 1985, now abandoned and entitled Wet-Winding Submersible Motor.

This invention relates to the structure of an electric motor, and more particularly to a wet-winding submersible motor.

Many designs of submersible motors have been offered on the market and described in patents. Such motors normally have a relatively long length and small diameter and are designed to be operated while submersed, for example, in a water well. Normally the interior of the motor is prefilled with a liquid, such as a water solution or oil.

In smaller motors of this type, the stator windings are usually protected by being embedded in plastic and enclosed in a sealed stator enclosure. However, motors having a larger size and rating may be of the "wet-winding" type wherein the stator windings are exposed to the interior liquid. The windings have a relatively heavy layer of insulation to protect them from the liquid which may be a solution of water and antifreeze.

It is important that wet-winding motors be repairable. Repair is sometimes required during manufacture when tests show that the windings are defective, and it is sometimes required after the motor has been in service. The latter situation may arise because the interior solution, over a long period of time, seeps through the wire insulation. Since motors of this type are expensive, repair is preferable to the cost of a new motor.

Repair of such motors is complicated, however, by the nature of the stator construction of prior art motors. The stator windings have a relatively long extension beyond the ends of the stator laminated core because the winding end turns are long due to the thick insulation on the wires. Consequently the outer shell of the stator must also be long because it must overhang and enclose the windings and also provide means for supporting the bearings and the attachment to a pump driven by the motor. It will be obvious that a stator core secured within a long stator shell is difficult and expensive to manufacture and to repair. To avoid this problem, in some motors of this type the stator laminated core is first secured to a short stator shell, and after the windings are installed, shell extensions are fastened to the ends of the short shell. In instances where the extensions are welded to the short shell, a repair can be made only by cutting the shell apart. In other instances where the extensions are threaded to the short shell, increased manufacturing expense is encountered and alignment of the bearings is made difficult.

It is a general object of this invention to provide an improved wet-winding motor construction which avoids the foregoing problems.

BRIEF SUMMARY OF THE INVENTION

A motor in accordance with this invention comprises a tator core having stator windings wound thereon and an elongated outer shell which surrounds the core and the windings, the shell extending lengthwise beyond the end turns of the windings and supporting the motor bearings. The core is slidable in the shell but is retained in place in the lengthwise direction by first and second abutments fastened to the interior of the shell at opposite ends of the stator. At least one of the abutments is a ring which may be removed, thereby enabling easy assembly or disassembly of the motor. The core is retained against angular movement by a key which engages lengthwise extending keyways in the core and the shell. The motor has additional important features which will become apparent from the following description and the drawings.

BRIEF DESCRIPTION OF THE DRAWINGS

The foregoing and other objects and advantages of the invention will be better understood from the following detailed description taken in conjunction with the accompanying figures of the drawings, wherein:

FIG. 1 is a longitudinal sectional view of a motor in accordance with the present invention;

FIG. 2 is an end view taken on the line 2—2 of FIG. 1;

FIG. 3 is an enlarged sectional view showing the upper end portion of the motor and taken on the line 3—3 of FIG. 2;

FIG. 4 is an enlarged sectional view showing a bottom portion of the motor;

FIG. 5 is a sectional view taken on the line 5—5 of FIG. 1;

FIG. 6 is a sectional view taken on the line 6—6 of FIG. 1;

FIG. 7 is a sectional view taken on the line 7—7 of FIG. 1;

FIG. 8 is a view of a part of the motor;

FIG. 9 is a sectional view of a motor in accordance with an alternate embodiment of the invention; and FIG. 10 is a fragmentary enlarged sectional view of a part of the motor shown in FIG. 8.

DETAILED DESCRIPTION OF THE DRAWINGS

With specific reference to FIG. 1, the motor comprises an outer tubular or cylindrical shell 10 which encloses a stator 11 and a rotor 12. The stator 11 includes a core 13 formed by a stack of stator laminations and a stator winding 14 which is wound through internal slots formed in the core 13.

The rotor 12 comprises a rotor core 16 which is secured to a rotor shaft 17. The construction of the rotor 12 may be a conventional cast aluminum or welded copper squirrel cage construction or permanent magnets fastened to the core 16.

The inner periphery of the shell 10 and the outer periphery of the stator core 13 are generally circular in cross section as shown, for example, in FIG. 6. The core 13 is snugly received within the interior of the shell 10 but it is slidable axially of the motor within the shell. The core 13, and consequently the stator windings 14 attached to the core 13, are held against axial movement within the shell 10 between two tubular spacers 21 and 22. The spacers may be formed by shaped sheet metal pieces which have a longitudinally extending split or gap formed therein as will be described hereinafter, the gap being indicated by the reference numeral 23 in FIG. 6. The upper spacer 21 is positioned against the upper side 24 of the core 13 and extends upwardly from the core 13 to a point which is above or beyond the upper end of the windings 14. Similarly, the lower spacer 22 engages the lower side 26 of the core 13 and extends downwardly to a position which is beyond the lower end of the stator windings 14.

The lower and upper ends of the spacers 21 and 22 are held in place within the stator shell 10 by lower and upper abutments, at least one of the abutments being readily removable so that the spacers and the stator may be removed in order to disassemble the motor. With reference first to the abutment at the lower end of the stator, an annular groove 31 (FIGS. 1 and 4) is formed in the inner periphery of the shell 10 and a snap ring 32 is mounted within the groove 31, the snap ring 32 extending radially inwardly beyond the inner surface of the shell 10, as best shown in FIG. 4. A lower bearing support 33 of the motor includes a radially extending circular flange 34 which extends radially outwardly to the inner surface of the shell 10, and the lower circular edge of the flange 34 abuts and rests on the upper surface of the snap ring 32, thereby preventing the bearing support 33 from moving downwardly. The bearing support 33 is further retained by at least one lug 36 (FIGS. 1,4 and 8) which is positioned against the lower surface of the ring 32 and against the adjoining lower surface of the flange 34. A hole 37 is formed in the lug 36 and the hole 37 is aligned with a threaded hole 38 formed in the flange 34. A bolt 39 is positioned through the hole 37 and threaded into the flange hole 38 in order to press the lug 36 tightly against the underside of the ring 32, thereby clamping the flange 34 tightly against the ring 32. A number of such lugs may be provided and be spaced angularly around the flange 34, and each of the lugs 36 may be formed by a short arcuate segment of metal.

As best shown in FIG. 1, the lower bearing support 33 further includes an upwardly extending tubular portion 41 which is on the motor axis and supports a bearing 42. The lower end of the rotor shaft 17 extends through the bearing 42 and the bearing 42, of course, supports the lower end of the shaft 17 for rotational movement within the stator.

With specific reference to FIGS. 1 and 3, the abutment at the upper end of the motor comprises an annular end ring 46 which is positioned within the shell 10 and against the upper edge of the upper spacer 21. Adjacent the upper edge of the end ring 46, an annular groove 47 is formed in the inner periphery of the shell 10, and a removable snap ring 48 is mounted in the groove 47. As shown in FIG. 3, the snap ring 48 extends radially inwardly beyond the inner peripheral surface of the shell 10 and extends over the upper surface of the end ring 46 in order to retain the end ring 46 against upward movement out of the shell. To form a liquid tight seal, an annular seal groove 49 is formed in the outer peripheral surface of the end ring 46 and an O-ring 50 is mounted in the groove 49, the O-ring 50 forming a seal between the outer periphery of the end ring 46 and the inner periphery of the shell 10.

Mounted on the upper end ring 46 and on the motor axis is an end bell 52 which includes an upper bearing support part 53 (FIGS. 1 and 3). The upper end bell 52 further includes a radially extending flange 54 which extends radially across the upper surface of the end ring 46 and up to the shell. A plurality of axially extending threaded blind holes 56 are formed in the upper side of the end ring 46, and axially extending holes 57 are formed through the flange 54 of the end bell 52, the holes 56 and 57 being aligned. A bolt 58 (FIGS. 1, 2 and 3) is positioned through each of the holes 57 and threaded into the associated hole 56 of the end ring 46 in order to tightly secure the end bell 52 to the end ring 46. In a specific example of the invention, four equally spaced bolts 58 are provided as shown in FIG. 2.

Referring to FIG. 3, the flange 54 of the upper end bell 52 has an annular groove 61 formed in its outer periphery which overlies the end surface of the shell 10. The axial depth of the groove 61 is made such that a slight space 165 is formed between the lower face of flange 54 of end bell 52 and the upper face of the end ring 46 after the bolts 58 are tightened. Further, a groove 62 is formed in the lower and outer corner of the flange 54, the diameter of which allows it to closely fit into the inner periphery of the snap ring 48. The axial depth of the groove 62 is made such that it leaves a slight axial space 162 between the top surface of snap ring 48 and the face of the groove 62 when the bolts 58 are drawn tight. The purpose of leaving the spaces 162 and 165 is to assure that when the bolts 58 are drawn tight, the end ring 46 will be drawn tightly against the lower surface of the snap ring 48, which in turn will be drawn tightly against the upper face of its shell groove 47, and the flange 54 of the upper end bell 52 will be drawn tightly downward against the upper face of the shell 10, thus assuring no possibility of motion between any of these four parts.

The bearing support part 53 of the upper end ring 52 extends axially downwardly from the flange 54 and around the rotor shaft 17, and a tubular bearing 63 is carried within the bearing support part 53 and rotatably supports the upper end portion of the rotor shaft 17. A seal is formed between the inner periphery of the end ring 46 and the outer periphery of the bearing support part 53 by an O-ring 64 which is mounted in an annular groove 66 formed in the outer periphery of the bearing support part 53.

The upper end bell 52 has an axially located annular opening 71 formed in it, and the upper end portion 76 of the rotor shaft 17 extends upwardly through the opening 71. A conventional rotary shaft seal is provided within the opening 71 between the end bell 52 and the rotor shaft 17, the rotary seal being formed by stationary part 72 (FIGS. 1 and 3) which is fastened to the end bell 52, and by a rotary part 73 which is attached to and rotates with the upper end portion of the rotor shaft 17. A guard 74 is fastened to the rotor shaft 17 above the rotary shaft seal and rotates with the shaft, and prevents the entry of dirt into the seal area.

The upper end portion 76 of the shaft 17 is adapted to be connected to a pump, for example, to be driven by the motor. The housing of the pump is positioned on and secured to the upper end bell 52, and in the present example this is accomplished by a plurality of threaded holes 77 (FIGS. 1 and 3) that extend axially through the flange 54 of the end bell 52. The pump housing (not shown) is positioned in a locating groove 78 formed in the upper surface of the flange 54 and mounting bolts (not shown) are connected to the pump housing and threaded into the holes 77 (FIGS. 1, 2 and 3) in order to tightly secure the pump housing to the end bell 72. Axially aligned with each of the threaded holes 77 in the flange 54 is a blind axial opening 79 formed in the upper side of the end ring 46. The provision of the opening 79, which has a larger diameter than the bolt received in the hole 77, is advantageous because it allows for an extra length of the mounting bolt so that the bolt can extend entirely through the hole 77 and into the opening 79. Alternatively, the hole 77 could be made oversized and not threaded, and the opening 79 in the end ring 46 could be threaded, in which case the mounting bolts would extend loosely through the holes 77 and be tightly threaded into the openings 79 of the end ring 46 in order to secure the motor housing directly to the end ring 46. This alternative arrangement (not illustrated) may be desirable in some constructions because it would enable the bolts 58 to have a lighter construction because the mounting bolts between the motor and the pump housing would be connected directly to the end ring 46 so that the end ring would directly bear the load of the pump.

As mentioned, the snap rings 32 and 48 form removable abutments which prevent endwise movement of the stator core. The stator core is also held against angular movement by a lengthwise extending key 116 located in a longitudinal keyway or groove 117 formed in the inner periphery of the shell 10. The two spacers 21 and 22 are split as previously mentioned, and the key 116 extends through the gap formed between the adjoining edges of the spacer as shown in FIG. 6. The key 116 also engages and secures the end ring 46 and the lower bearing support 33 against rotation. As shown in FIGS. 1 and 4, a groove 118 is formed in the outer peripheral surface of the lower bearing support 33 (see FIG. 5), a similar groove 119 is formed in the outer peripheral surface of the end ring 46 (see FIG. 3) and a groove 121 is formed in the outer peripheral surface of the stator core 13. The grooves 118, 119 and 121 are radially aligned with the groove 117 formed in the stator, and the key 116 extends between the grooves and thereby prevents the core 13, the lower support 33 and the end ring 46 from rotating relative to the stator 10. As shown in FIGS. 1 and 3, the groove or keyway 119 in the end ring 46 extends from the lower peripheral surface upwardly to about half the axial length of the end ring 46, the groove 119 stopping short of the O-ring groove 49 so as not to interfere with the seal.

With reference again to FIG. 1, the shell 10 further encloses a thrust bearing arrangement 81 at the end of the motor for supporting the axial load of the pump through rotor shaft 17. The thrust bearing arrangement 81 comprises a conventional Kingsbury-type bearing including an upper rotating part 82 to which is keyed a bearing ring 88, the assembly of which is fastened to and rotates with the lower end portion 83 of the rotor shaft 17, a pivoted stationary part 84, and an axially located support pin 86. Since the thrust bearing 81 may have a conventional construction, it is not described herein in detail. Briefly, a plurality of tiltable bearing segments 87 supported by the stationary part 84 engage the bearing ring 88 of the rotating part, and a liquid film forms between segments 87 and the ring 88 which supports the rotor during motor operation.

The threaded pin 86 is located in a lower thrust support 91 (FIG. 1) which extends across the lower end of the shell 10. A centrally located threaded hole 92 receives the pin 86, which is adjustable upward and downward in the support to permit axial positioning of the stationary thrust part 84. The engaging surfaces 93 between the pin 86 and the part 84 are rounded to enable the part 84 to pivot on the pin 86. A ridge 94 formed on the upper side of the support 91 is located in a groove 96 formed in the underside of the stationary part 84, to prevent the part 84 from rotating relative to the support 91. The support 91 further includes an annular portion 97 which rests on the upper side of a snap ring 98 which is fastened in an annular groove 99 formed in the inner periphery of the shell 10. The snap ring 98, of course, retains the thrust support 91 against downward movement relative to the shell 10. On the underside of the ring 98 and engaging the lower edge of the shell 10 is a bottom cover and support plate 101 which closes the lower end of the motor. The plate 101 includes a center portion 102 which extends across the underside of the shell 10, and a plurality of axially extending bolt holes 103 are formed in the plate 101. Bolts 104 extend through the holes 103 and are threaded into holes 106 formed in the underside of the thrust support 91 in order to tightly secure the bottom plate 101 to the bottom end face of the shell 10. An O-ring seal 107 is located in an annular groove formed in the outer periphery of the bottom plate 101 and engaging the inner surface of the shell 10 in order to form a seal between the outer periphery of the support plate 101 and the inner periphery of the shell 10.

The bottom cover and support plate 101 also houses means for equalizing the pressure of the interior liquid within the motor with the exterior pressure. Such means comprises a bellows 108 (FIG. 1) which extends across the bottom side of the thrust support 91, the outer peripheral portion 110 of the diaphragm being compressed between the lower side of the thrust support 91 and the upper side of the bottom plate 101. A compression spring 109 is positioned between the underside of the diaphragm 108 and the upper side of the central portion of the bottom plate 101 and urges the diaphragm 108 upwardly. During operation of the motor, the motor parts and the interior solution become heated and expand, and the pressure causes the diaphragm 108 to move downwardly slightly from the position shown in FIG. 1, thereby allowing for the expansion of the interior solution without forcing the solution out of the motor cavity through the motor seals. A hole 111 is formed in the bottom cover 101 to enable the exterior liquid to move into and out of the interior of the bottom cover 101 as the diaphragm 108 expands and contracts.

The following is a series of steps which may be followed in the assembly of the foregoing described motor parts, although the steps need not be followed in the order listed. The lower rotary bearing support 33 is positioned within the interior of the shell 10 and the snap ring 32 is placed in its groove 31. The lower spacer 22 is then placed in the shell. The stator core 13, with the windings 14 on it, is installed, and the upper spacer 121 is positioned on top of the core 26. The grooves 118, 121 and those in the spacers are aligned with the groove 117 of the shell, and the key 116 is installed in the keyway. Thereafter the end ring 46 is positioned in place and the upper snap ring 48 is installed in the groove 47, thereby holding the lower bearing support and the end ring 46 in place. The rotor 12 is then placed within the rotor cavity with the lower portion of the shaft 17 in the bearing 42 of the lower support. The rotary seal and the end bell 52 are installed and secured to the end ring 46. At this point, the shaft 17 of the rotor is properly aligned with the bearings, and then the lugs 36 are secured in place by the screws 39 in order to secure the lower bearing support 33. The lower snap ring groove 31 is preferably formed slightly oversized, as shown in FIG. 4, so that the snap ring 32 can adjust its position to maintain the proper bearing alignment. The thrust bearing 81 in the lower end of the shell and the snap ring 98 are then installed. The position of the pin 86 may also be axially adjusted to properly locate the rotor within the cavity. Thereafter the diaphragm 108 and the bottom cover 101 are installed by threading the bolts 104 into the support 91.

If the stator requires servicing later on, this may be accomplished simply by first removing the bolts 58 securing the end bell 52 to the end ring 46, removing the snap ring 48, and removing the end ring 46. The rotor 12 and the stator 11 may be removed after the spacer 21 is lifted out of the motor.

The arrangement shown and described in connection with FIGS. 1 and 4 includes the snap ring 32, the lugs 36 and the bolts 39 for fastening the lower bearing support 33 to the shell 10. Since the groove 31 is oversized relative to the ring 32, as mentioned above, the ring 32 is able to adjust its position to attain proper alignment of the bearings 42 and 63, and this construction may be referred to as a self-alignment feature. In some constructions, however, a more rigid mounting for the lower bearing support may be desired, and such an arrangement is shown in FIGS. 9 and 10. Only the differences between the motor of FIG. 9 and the motor of FIG. 1 are described in detail, and generally the same reference numbers are used for corresponding parts.

The rotor is supported within a cylindrical shell 10 and the rotor shaft 17 is received by a lower bearing 42 and a lower bearing support 201. A thrust bearing 81 engages the lower end 83 of the rotor shaft 17, and a bottom cover 101 closes the bottom of the shell 10. As mentioned, the parts not described in detail may be the same as the corresponding parts shown in FIGS. 1 to 8.

The lower bearing support 201 includes a radially extending flange 202 which has an axial slot or groove in its outer periphery for the key 116. The flange 202 further has an annular groove 203 formed in its outer periphery, the groove 203 being accurately machined to be concentric with the center opening 204 that supports the lower bearing 42.

The interior surface of the shell 10 has two annular snap ring grooves 206 and 207 formed in it adjacent the groove 203 of the flange 202. An upper snap ring 208 is located in the upper groove 206 and a lower snap ring 209 is located in the lower groove 207. As best shown in FIG. 10, the axial dimensions of the grooves 206 and 207 are slightly greater than that of the rings 208 and 209. The upper surface of the upper ring 208 engages the surface 211 at the upper end of the groove 203, and the lower surface of the upper ring 208 engages the lower surface of the groove 206. The upper surface of the lower ring 209 engages the upper surface of the lower groove 207. A plurality of circumferentially spaced clamping lugs 36 are positioned against the lower surface of the lower ring 209, and the lugs 36 further engage the lower surface of the flange 202. The bolts 39 tightly secure the lugs 36 to the flange. As is best shown in FIG. 10, a clearance space 212 is formed around the threaded hole 213 for the shank of each bolt 39, but rises 214 are formed on the underside of the flange 202 adjacent the radially inward edges of the lugs. Consequently the radially inward and outward edges of each lug respectively engage a rise 214 and the ring 209, as shown in FIG. 10, and a bolt 39 extends between each rise 214 and the ring 209.

When assembling the motor, the two snap rings 208 and 209 are mounted in the grooves 206 and 207, and the lower bearing support 201 is positioned in the shell with the surface 211 on the upper ring 208. The lugs 36 and the bolts 39 are then fastened to the flange 202. As the bolts 39 are tightened, the surface 211 is pulled down flat against the upper surface of the ring 208, and the ring 208 is pulled down flat against the lower surface of the groove 206. The upper surface of the lower ring 209 is pushed up flat against the upper surface of the groove 207 by the lugs 36. Consequently the two snap rings 208 and 209 and the portion 216 of the shell 10 between the two grooves 206 and 207, are tightly clamped between the surface 211 and the lugs 36 on the lower bearing support. Thus the lower bearing support 201 is rigidly clamped to the shell 10, and the bearing 42 will be coaxially aligned with the shell 10 because the surface 211 and the snap ring grooves are machined to be in coaxial alignment with the shell.

It will be apparent that a motor and method as described have numerous advantages. The removable snap ring 48 enables the end ring 46 and the other motor parts to be disassembled. The end ring 46 is connected through end bell 52 to the pump being driven, and the ring 46 is held against axial movement by the snap ring 48 and against rotational movement by the key 116. The key in the keyway further serves to prevent rotation of the stator core 13, the end ring 46 and the lower bearing support 33. The keyway and the key stop short of the O-ring seal 50, however, and therefore do not interfere with this seal. The arrangement of the lower snap ring 32 in the oversized groove 31 allows the lower bearing support to self-adjust to the location of proper bearing alignment. Where a rigid assembly of the lower bearing support is desired, an arrangement with two snap rings as shown in FIGS. 9 and 10 may be used.

The provision of the axial space or clearance 165 between the end ring 46 and the end bell 52, and the space 162 between the top of the snap ring 48 and the face of the flange groove 62, assures that there is no permissible motion between the shell, the upper end bell, the snap ring, and the end ring when the bolts 58 are fastened.

FIGS. 1 and 3 show an arrangement wherein the end ring 46 is separate from the snap ring 48, and the upper end bell or bearing support 52 is fastened to the end ring 46 by the bolts 58. An alternative arrangement may instead be provided wherein one part performs the functions of both the snap ring 48 and the end ring 46. A snap ring engageable with a groove in the shell, similar to the engagement of the ring 48 with the groove 47, may have radially inwardly extending bosses formed on its inner periphery. The bosses would be sufficiently large that threaded holes (similar in function to the holes 56) are formed in them, and the upper bearing support 52 would be bolted to the lugs and thereby be attached directly to the snap ring. Such a snap ring would be flexed during installation in the relatively thin portions between the lugs.

What is claimed is:

1. An electric motor comprising
    (a) a tubular outer shell,
    (b) a stator core positioned in said shell and forming an interior rotor cavity, said core being sized to be axially slidable in said shell,
    (c) a rotor positioned in said rotor cavity,
    (d) first bearing support means in said shell at a first end of said shell and rotatably supporting said rotor,
    (e) second bearing support means in said shell at a second end of said shell and rotatably supporting said rotor,
    (f) first abutment means connected to said first end of said shell and retaining said first bearing support and said stator core against axial movement out of said first end of said shell, (g) second abutment means connected to said second end of said shell and retaining said second bearing support and said stator core against axial movement out of said second end of said shell, and (h) at least one of said abutment means being removable, said second abutment comprising second and third snap rings, said shell having spaced apart annular second and third grooves in the inner periphery thereof, and said second and third snap rings being located in said second and third grooves, respectively, and clamping means on said second bearing support for clamping said second bearing support to said second and third snap rings.

2. An electric motor as in claim 1, wherein said shell a space portion between said second and third grooves, said clamping means comprising a surface of said second bearing support and at least one lug secured to said second bearing support, said surface and said lug engaging said second and third snap rings and clamping said second and third snap rings and said space portion therebetween.

3. An electric motor comprising (a) a tubular outer shell, (b) a stator core positioned in said shell and forming an interior rotor cvity, said core being sized to be axially slidable in said shell, (c) a rotor positioned in said rotor cavity, (d) first bearing support means in said shell at a first end of said shell and rotatably supporting said rotor, (e) second bearing support means in said shell at a second end of said shell and rotatably supporting said rotor, (f) first abutment means connected to said first end of said shell and retaining said first bearing support and said stator core against axial movement out of said first end of said shell, (g) second abutment means connected to said second end of said shell and retaining said second bearing support and said stator core against axial movement out of said second end of said shell, and (h) at least one of said abutment means being removable, and first and second spacer means extending between said stator core and said first and second bearing support means respectively.

4. An electric motor as in claim 3, wherein each of said spacer means comprises a relatively thin tubular member positioned closely adjacent the inner periphery of said shell.

5. An electric motor as in claim 4, and further including retainer means for preventing rotational movement of said stator core, said retainer means comprising a generally axially extending key and aligned keyways between the inner periphery of said shell and the outer periphery of said stator core, said keyways receiving said key.

6. An electric motor as in claim 5, wherein aligned keyways are further formed between said shell and said spacer means and said first and second bearing support means, and said key further extends through said last-mentioned keyways.

* * * * *